Patented Mar. 30, 1926.

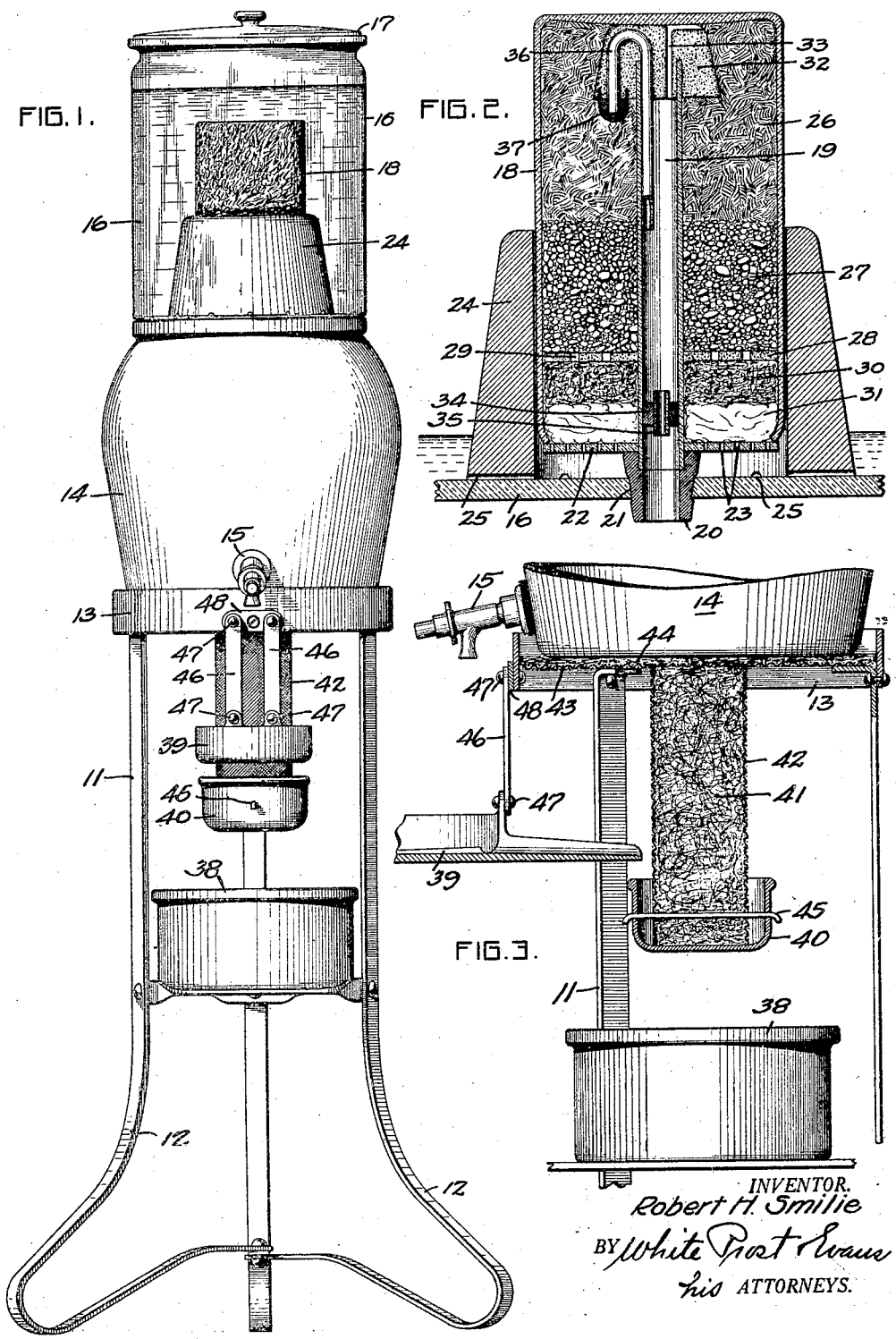

1,579,158

UNITED STATES PATENT OFFICE.

ROBERT H. SMILIE, OF OAKLAND, CALIFORNIA.

WATER FILTER.

Application filed January 8, 1923. Serial No. 611,509.

*To all whom it may concern:*

Be it known that I, ROBERT H. SMILIE, a citizen of the United States, and a resident of the city of Oakland, in the county of Alameda and State of California, have invented a new and useful Water Filter, of which the following is a specification.

This invention relates to a device for filtering and cooling water that is to be used either for domestic purposes, or for supplying drinking water generally. More particularly the invention contemplates the provision of a compact device of this character, that is capable of being easily installed and supported on the usual framework so that it may be in a readily accessible position for use.

In order to filter the water properly, it is necessary that it be passed through some material that will prevent anything except the pure water from passing through. A filtering medium that has been found to be highly desirable is a combination of charcoal in the form of granules and asbestos. It is customary to provide other kinds of filtering material in combination with the materials such as sand, gravel, marble chips, or the like. It is quite readily apparent that filtering mediums of this character must be replaced occasionally, for otherwise they become so saturated with waste matter or impurities that their function is materially impaired. Although water filters utilizing such materials have been proposed and used, it has nevertheless been difficult or inconvenient to replace them. It is one of the objects of my invention to provide a compact filtering unit that may be quickly and easily replaced in a water filter.

One of the chief reasons why in filters as heretofore constructed the filtering material is difficult or inconvenient to replace is that a downward flow for the water is depended upon to force it through the filtering material, and this necessitates a receiving tank which is disposed above the filtering material receiver. With my device the provision of filtering material receivers outside the receiving tank is obviated. It is thus another object of my invention to simplify the entire filtering combination by the provision of means that replaces the usual type of flow of liquid. The filtration, I have found, may most conveniently be effected by a siphoning action, which depends upon a difference in pressure at several points in the system. In this construction, it is still another object of my invention to provide for adjusting the relative lengths of the siphon legs, whereby the level of liquid that remains unfiltered in the receiving tank may be determined.

In my device, one of the siphon legs carries the filtering material and communicates with the intake reservoir or receiving tank. The other leg communicates with the storage and cooling tank. It is still another object of my invention to maintain these siphon legs substantially entirely full with liquid at all times, independently of the condition of water level in the intake reservoir. By this means it is assured that proper siphoning action takes place immediately upon placing even a very small quantity of liquid into the intake reservoir, and it is unnecessary, in order to start the siphon, to bring the liquid level up to the highest point of the siphon after the first filling.

The usual prior provisions for cooling the water in the tank that receives it after filtering may consist of an enclosing chamber for the tank where ice may be packed; sometimes this storage tank itself is made of porous pottery or earthenware, in order to assist evaporation from its exterior surface of slight amounts of the water which seep through the walls. Both of these methods of cooling are objectionable from several standpoints; where ice is used, a constant supply is needed, and is expensive. Furthermore, mechanical complications arise in connection with the drain from the ice compartment. Where porous earthenware or pottery is used for the storage tank, the pottery tends to become stopped or clogged from the deposition of minerals in the water. It is still another object of my invention to provide a device having an impervious container that may be cooled by evaporation of liquid from its external surface. This cooling effect may be used alone or in combination with icing.

Another object of my invention resides in so arranging the outlet or tap from the tank that even a comparatively large vessel may be placed under it for filling. For this purpose I preferably provide a drain beneath the tap that is movable so as to leave a comparatively large free space directly below this tap.

My invention possesses other advantageous features, some of which, with the foregoing, will be set forth at length in the following description, where I shall outline in full that form of the invention which I have selected for illustration in the drawings accompanying and forming part of the present specification. Although in the drawings I have shown but one embodiment of my invention, it is to be understood that I do not desire to be limited thereto, since the invention as expressed in the claims may be embodied in other forms also.

Referring to the drawings:

Figure 1 is a front view of a complete filter and cooler with its stand, that embodies my invention;

Figure 2 is an enlarged sectional view of the receiving tank and filter used in connection with the device shown in Fig. 1; and Figure 3 is an enlarged sectional view of the lower portion of the device, showing in greater detail the provisions for cooling the storage tank.

The filtering and cooling devices may be appropriately supported upon a metallic structure or stand 11, which includes the legs 12 and the collar 13. Upon this structure rests a storage vessel or tank 14, preferably made of glass or impervious material. A tap 15 of any appropriate sort is located near the bottom of the vessel 14 in order to permit water to be drawn from the vessel. The top of this vessel or jar 14 is open, and serves to support the intake reservoir or receiving tank 16. This tank is shown in the present instance as made of transparent material such as glass, so that the level of water therein may be visible. The tank 16 has a cover 17 for preventing undue evaporation of the liquid in the tank and also to protect the liquid from the introduction of any foreign matter.

The liquid that is poured into the intake reservoir 16 gradually passes into the cooling and storage tank 14, through various filtering mediums. I provide a very convenient and simply constructed filter 18, that is adapted to be placed within the vessel 16. I have found that common preserve jars may be used as the encompassing vessel for this filter 18, which operates by a siphoning action to draw liquid through the filtering materials in the jar and discharge it through a central standpipe 19. This standpipe, and the concentric space around it within the jar 18, form the two legs of a siphon which may become active by placing the jar 18 in an inverted position in the intake reservoir 16. The standpipe 19 extends into a rubber stopper 20 which in turn tightly engages an aperture 21 formed in the bottom of the tank 16. In this way the standpipe is placed in communication with the interior of the cooling and storage tank 14. The jar 18 also has a porcelain or glass cover 22 which assists in maintaining the filtering material in place in the space formed concentric to the glass standpipe tube 19. This cover 22 is furthermore so arranged that it permits the passage of liquid past it into the jar 18, as for example by the aid of the apertures 23. A comparatively heavy jar supporting ring 24 is disposed upon the bottom of the intake reservoir 16 for preventing the jar 18 from tipping over. This ring is preferably made from rigid material such as porcelain or earthenware, and has furthermore communicating passages such as 25 for permitting liquid exterior of the ring 24 to enter into the space where the jar 18 is disposed.

In order that the entire filtering arrangement may be easily manufactured as a compact unit within the jar 18, the standpipe 19 as well as certain other elements that will be described hereinafter, are first placed within the jar 18, and then layers of filtering material are firmly packed in around the standpipe. In the present instance a comparatively thick layer 26 of marble chips is shown as disposed on the bottom of the jar, after which a thick layer 27 of charcoal in the form of granules is deposited. In order to hold these two layers firmly within the jar 18, I preferably cast from cement a retainer wall 28 on top of these layers, which wall has apertures 29 for permitting the rise of liquid into these layers. On top of the cemented wall 28 there are packed several further layers of filtering material, such as comparatively thin layers 30 and 31 of asbestos and cotton respectively. These two latter layers are prevented from dropping out in the inverted active position of the jar by the aid of the cover 22 referred to hereinbefore. The arrangement is such that liquid rising through the layers 31, 30, 27 and 26 in this order, is finally permited to spill over into the standpipe 19.

Although the apparatus as thus far described is capable, under certain circumstances, of efficiently filtering liquid poured into the intake reservoir 16, certain limitations to its operation become apparent as the principles involved in this operation are analytically considered. I shall later on describe how these limitations may be readily overcome. With the apparatus as thus far described, in order that filtered liquid may drop through standpipe 19 into the cooling tank 14, it is necessary first of all that there be a sufficient head of liquid in the tank 16 so as to carry the level of the liquid to the top of the standpipe 19 within the filter 18. This means that the level of water in the reservoir 16 must reach high enough to cover the filter 18 almost entirely. When this condition is fulfilled, the liquid gradually passes either through the passageways 25 in the support 24, or down between this support and jar 18, then through apertures 23 in the cover 22, and finally upwardly through the filtering layers in jar 18. This passage of the liquid upwardly is produced by gravity, acting upon the weight of liquid in tank 16. After a while liquid spills over the top of standpipe 19, which in the present device is of such large diameter that it would probably never become filled so that no siphoning effect could be initiated. The filtering effect would stop as soon as the level of the liquid is reduced to that of the top of standpipe 19, and only that much of the liquid would be filtered which is equivalent to the liquid lying above the top of the standpipe. However, even if such a siphon action would result, this effect would of course also be a gravity effect as well, since it depends upon a variation in the level of liquid at the intake end and at the delivery end of the siphon. The siphoning action would continue until most of the liquid would be withdrawn from the reservoir 16, and air drawn into the filter jar 18. In order to start the siphon again, it would be necessary to refill the container 16 to at least the top of standpipe 19; it would be impossible to filter a relatively small quantity of liquid at a time. This limitation in the operation of the filter is of course due to the fact that the siphon is not maintained filled even after the filter becomes inactive. By a proper arrangement of my device, it is possible to initiate a siphoning action and to maintain the siphon in an operative condition even when inactive, so that the addition of a relatively small amount of liquid to the reservoir 16 starts the siphoning immediately. It is to be noted, however, that even with the simple form of the invention as thus far described, the flow of liquid is always upward when it passes through any filtering material, and due to this fact, any heavy sediment that may be present in the liquid cannot be carried into the filtering materials and thus reduce their effectiveness.

In order to provide for a convenient and compact arrangement for supporting the standpipe 19 within the jar 18, as well as the other elements that are to be described in detail later, the standpipe 19 is cast into a cementitious base or support 32 before it is assembled with the jar 18. This support in turn has a duct 33 which places the pipe 19 in communication with the space surrounding this pipe, near the top of the filtering material in the jar 18. If no other opening from the standpipe to the filtering material were provided, the rise of liquid through the filtering material would eventually cause it to spill over through this duct 33, and the siphoning would begin. This siphoning continues until a balance is reached between the pressures on each leg of the siphon. Since the bottom of the stopper 20, the passage in which forms a continuation of the passage through the pipe 19, extends below the bottom of the vessel 16, it is evident that before any such equalization could take place, and with no further provisions for reducing the effective length of this siphon leg substantially all of the liquid would be emptied from the vessel 16 by the siphon. Furthermore, the siphon would not be entirely filled, and could not become active again until the level of liquid in tank 16 is brought up to the highest point of the siphon.

In order to keep the siphon filled, I prevent the tank 16 from emptying completely, and this result I obtain by making the siphon leg formed by the standpipe 19 of a predetermined length, the bottom of this leg reaching a small but appreciable distance above the bottom of jar 18. As soon as the level of liquid in this tank recedes to the level of the bottom of this leg, then the siphon is in equilibrium, and there will be no longer any siphoning action, although both legs of the siphon will be full. The siphon will immediately function upon even a minute rise of level in the tank 16, for then the equilibrium would be disturbed, and the siphoning would continue until the level is restored to its equilibrium position. For setting the length of the leg most conveniently, I provide a short length of rubber tubing or a washer 34 slidable tightly within standpipe 19, and carrying a short tube 35. The lower end of this tube forms the end of the siphon leg, and by adjusting the position of the washer 34 within the tube 19, this end may be raised or lowered to any desired point. When the level of liquid in tank 16 reaches to this lowermost point, as is shown in Fig. 2, the pipe 19 is filled down to the bottom of the tube 35, but is empty from that point down. Atmospheric pressure is present in the storage tank 14 due to the fact that the reservoir 16 does not make a tight fit upon tank 14, and this atmospheric pressure supports this column of liquid in standpipe 19. The siphon, therefore, has a position of equilibrium to which it tends to return even for a small increase in the level of the liquid in the reservoir 16, and it is not at all essential to fill up the reservoir completely in order to begin siphoning again.

If the siphon be permitted to remain in its inactive state of equilibrium, for an appreciable length of time, there may be a tendency for air to rise in the standpipe 19 through tube 35, due to the formation of drops at the bottom of this tube that may permit a small air bubble to pass it. If continued, this action may depress the upper level of the liquid at the top of the standpipe that it would be difficult to start the siphoning action. The rise of air in the standpipe may be corrected in several ways; for example, the tube 35 may be a capillary tube, in which case any drop forming on the end of tube 35 would cover the opening so completely that there is no opportunity for air bubbles to travel past it. In case a capillary tube 35 is used, as shown in Fig. 2, then it is advantageous to maintain the bottom of this tube at a distance from any surface, so that the meniscus formed at that end may not be harmfully distorted by the surface tension. This effect is most conveniently provided by using a tube such as shown in Fig. 2 that may be passed part ways through the rubber washer 34.

There may also be a slight accumulation of air in the other leg of the siphon, formed by the space concentric to the standpipe 19 and filled with the filtering material. This accumulation cannot be prevented, and is partly due to the adherence of relatively small air bubbles to the filtering material particles as the liquid first rises through them. Gradually these bubbles separate from the filtering material and rise to the top end of jar 18. However, this air is limited in volume, as is evident, once the siphon is in operation. An added source of air is that forced through duct 33 from pipe 19 as this pipe becomes filled upon the initial filling of the filter. In order that this accumulation of air be prevented from interfering with the operation of the siphon, I provide a path for the liquid at the top of jar 18 that serves as a by-pass around the air pocket. For this purpose a bent tube 36 is embedded in the cement support 32, which has a long leg in communication with the standpipe 19 and a short leg in communication with the filtering material space at a point materially below the air pocket. In order to prevent the carrying over of any solid filtering material particles, a meshed guard 37, preferably non-metallic, surrounds the projecting short leg, and is firmly supported in the base 32.

The full operation of the siphon may now be set forth. After the washer 34 is positioned at the proper level, and the jar 18 placed bottom up in the position shown in Fig. 2, the siphon may be started by filling the reservoir 16 to at least as far as the top bend of the small tube 36. The liquid is gradually forced through the filtering material by gravity and the major portion of the air therein is forced through the duct 33 and out through tube 35. As soon as the liquid reaches the top bend of tube 36, it spills over into the standpipe 19, and drops through tube 35 into the storage tank 14. The siphoning action continues until the level of liquid in the reservoir 16 is the same as that of the bottom of tube 35. When this finally occurs, the syphon legs remain full and ready to operate again just as soon as the level of liquid in tank 16 is raised even by a slight amount. There may be some slight accumulation of air at the top of the filtering material due to the release of bubbles adhering to this material, but the tube 36 by-passes this air pocket, and it is thus impossible for this air accumulation to hinder the siphon action.

After the liquid reaches the storage tank 14, it is cooled to some extent by the evaporation taking place on the inside surface of this tank. In order to supplement this cooling so as to bring the temperature of the liquid to a still lower value, I provide devices that utilize the waste water from the drain. This waste water, before it is permitted to flow to the waste jar 38 from the tumbler drain 39, is caused to accumulate in a cup 40 suspended above the waste jar. In this cup it serves to impregnate absorbent material, such as asbestos 41, that may be packed within a hollow cylinder 42 formed of wire gauze or screening. This cylinder in turn is attached to a cooling pad support 43, also preferably made of screening. This member 43 has disposed upon it a cooling pad 44 of absorbent material, which is disposed on an exposed surface of the tank 14. For convenience, the support 43 and its pad 44 are placed on top of the supporting stand 11, so that the tank 14 may rest directly on the pad. The wicking 41 is placed in good contact with the pad 44, so that liquid drawn up from the cup 40 by the asbestos wick may be passed on to this pad and thus serve to keep the bottom surface of tank 14 moist. The evaporation of this liquid which is itself comparatively cool, causes a substantial drop in temperature of the liquid within the tank 14. In case not all of the liquid caught in cup 40 can be utilized for evaporation, this cup simply overflows into the waste jar 38. Furthermore in order to provide a convenient support for this cup 40, a pin 45 is utilized, passing completely through both the cup and the cylinder 42. This cylinder in turn may be directly suspended from the pad support 43.

In the ordinary form of cooler stand, the tumbler drain is rigidly supported underneath the tap 15, and it is thus impossible to draw liquid into a relatively large vessel from this tap. I preferably support the tumbler drain 39 in such a way that it may be moved away from under the tap 15. In the present instance it is shown as swung on a pair of parallel links 46, by the aid of the pivots 47. The upper extremities of these links may be pivoted to a short strap 48, in turn fastened to the rim or collar 13 of the supporting stand 11. Gravity acts to position this drain underneath the tap 15, but it may be held to one side while a large vessel is being filled. Movement of the drain in this way has no tipping action thereon, due to the parallel bar arrangement used for supporting it.

I claim:

1. In a filter, a liquid reservoir, a receptacle therein closed at its top, filtering material in said receptacle through which the liquid from the reservoir passes upwardly, a standpipe in the receptacle extending from adjacent the top of the receptacle to the exterior thereof and through which the liquid passes downwardly, and means disposed near the top of the standpipe for establishing a by-pass between the standpipe and the filtering material space at a distance below the top of the standpipe.

2. In a filter, a liquid reservoir, a receptacle therein closed at its top, fitering material in said receptacle, a standpipe entering the receptacle from its bottom and connecting to the exterior of the reservoir, and means disposed near the top of the standpipe for establishing a by-pass between the standpipe and the filtering material space at a substantial distance below the top of the filtering material.

3. In a filter, a liquid reservoir, a receptacle closed at its top and arranged within the reservoir, filtering material extending substantially to the top of the receptacle, an outlet pipe extending near to the top of the receptacle for conducting away the filtered liquid from that point, and means for maintaining the flow of liquid by gravity through the top of the outlet pipe when the level of the liquid in the receptacle recedes from the top of the outlet pipe.

4. In a filter, a siphon, filtering material within the siphon, and means providing a by-pass around air that may accumulate at the top of the siphon.

5. In a filter, a siphon, filtering material within the siphon, and means forming a by-pass around any air that may accumulate in the siphon.

6. In a filter, a siphon, filtering material held within said siphon, and means forming a by-pass for the liquid near the top of the siphon.

7. In a filter, a siphon, filtering material held within said siphon, and means forming a by-pass in the siphon for some of the space near the top of the siphon, said means becoming operative only when the space has been filled by the liquid.

8. In a filter, a siphon, filtering material held within said siphon, and a supplementary siphon forming a by-pass for liquid near the top of the main siphon.

9. In a filter, an intake reservoir, a stationary siphon connecting with the reservoir, filtering material through which liquid is conducted by the siphon disposed in one leg of the siphon and an element having an orifice therethrough arranged in the other leg of the siphon above the level of the bottom of the reservoir to maintain the siphon in filled condition.

In testimony whereof, I have hereunto set my hand.

ROBERT H. SMILIE.